Figure 4:
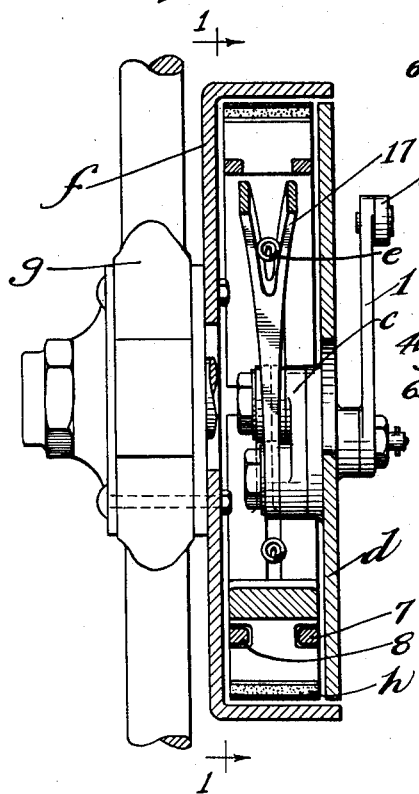

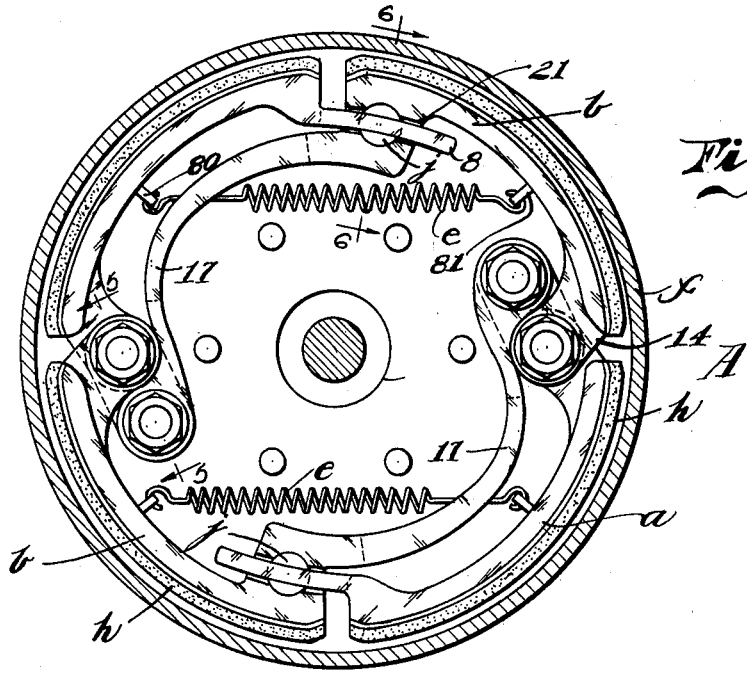

Aug. 22, 1933.   C. C. HIGGINS ET AL   1,923,437
BRAKE
Filed April 11, 1928   3 Sheets-Sheet 2

Inventor
Charles C. Higgins;
Harry D. VanBrunt;
By Blakeslee & Brown
Attorney

Aug. 22, 1933. C. C. HIGGINS ET AL 1,923,437
BRAKE
Filed April 11, 1928  3 Sheets-Sheet 3
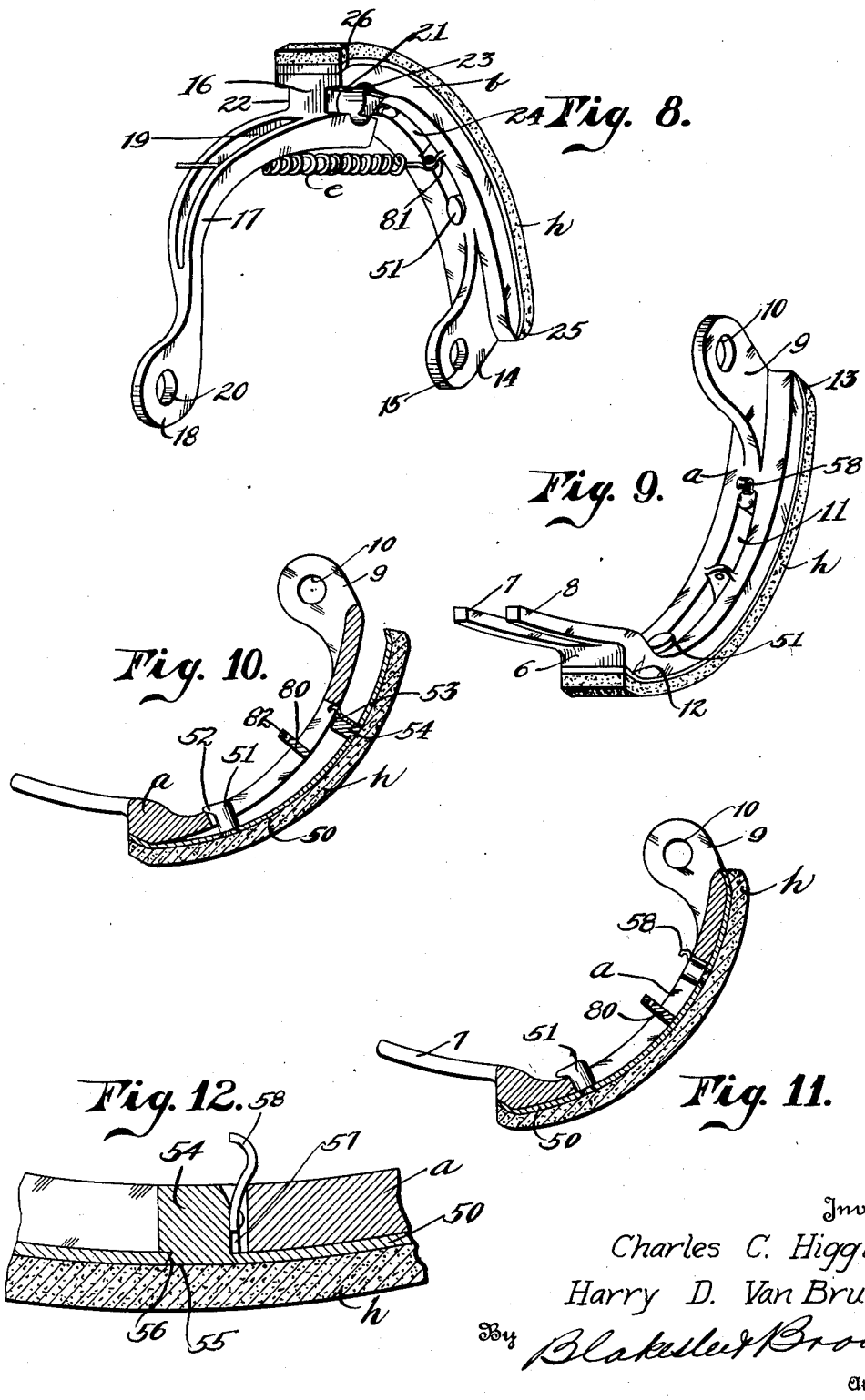
Inventor
Charles C. Higgins;
Harry D. Van Brunt;
By Blakeslee & Brown
Attorney Patented Aug. 22, 1933

1,923,437

UNITED STATES PATENT OFFICE 1,923,437

BRAKE

Charles C. Higgins, Riverside, and Harry D. Van Brunt, Los Angeles, Calif.; said Higgins assignor to said Van Brunt Application April 11, 1928. Serial No. 269,209

15 Claims. (Cl. 188—73)

This invention relates to brakes, and particularly to a novel form of brake wherein numerous deficiencies now existing in what is generally known as an expansion brake are effectively overcome. In particular, the brake to be described is adaptable for automobile use.

The invention has for an object the provision of a device of the character stated wherein the necessity of frequent adjustment is effectively overcome.

Another object is the provision of a brake or clutch device in which all contacting elements thereof move equally to assure an even application of braking surface or clutch surface.

Another object is the provision of a device of the character stated wherein any lining member to be carried thereby may be readily applied without the necessity of removing the several units of the device.

Other objects include a device which is simple in structure, easy to manufacture, efficient in use and service, durable, and without parts subject to disorder.

With the above and other objects in view, the invention consists in the novel and useful provision, formation, construction, association and relative arrangement of parts, members and features, all as shown in certain embodiments in the accompanying drawings, described generally, and more particularly pointed out in the claims.

Figure 5:
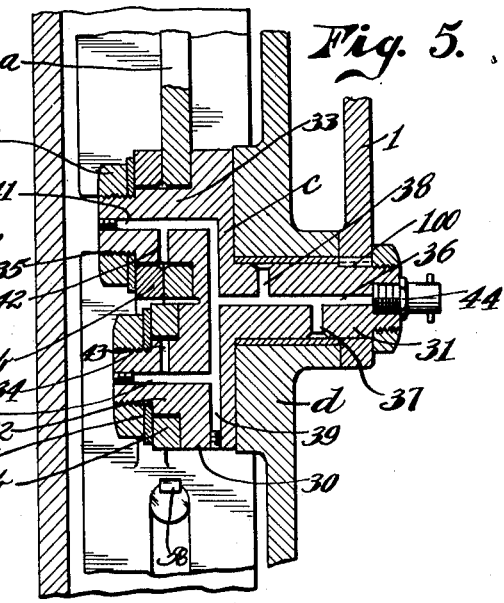
Figure 6:
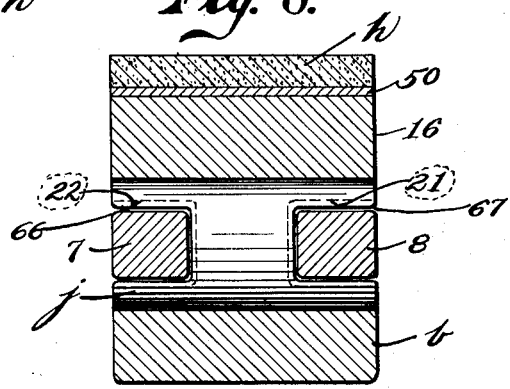
Figure 7:
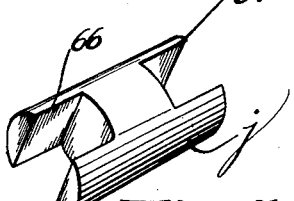

In the drawings:

Figure 1 is a vertical sectional view on the line 1—1 of Figure 4, showing the various operative features of the invention, Figure 2 is a view similar to Figure 1 and showing certain of the braking elements in changed position, Figure 3 is an elevation of the invention applied to a wheel, Figure 4 is a cross-sectional view on the line 4—4 of Figure 3, Figure 5 is an enlarged cross-sectional view on the line 5—5 of Figure 1, Figure 6 is an enlarged cross-sectional view on the line 6—6 of Figure 1, Figure 7 is a perspective view of an element of the invention, Figure 8 is a perspective view of one of the brake shoes, Figure 9 is a perspective view of a brake shoe adapted to be associated with the brake shoe shown in Figure 8, Figure 10 illustrates a method of application of a brake lining to the brake shoe, Figure 11 is a view similar to Figure 10 and showing the brake lining in position on the brake shoe, and Figure 12 is an enlarged cross-sectional view illustrating the means for maintaining the brake lining on the brake shoe.

Referring now with particularity to the drawings, the improved device is designated as an entirety by A, and the same includes brake shoes $a$ and $b$, of which there may be a plurality arranged in alternate relation, means $c$ for controlling movement of the brake shoes $a$ and $b$, and means $d$ adapted to carry the elements $a$, $b$ and $c$, as well as means $e$ adapted to act between the means $a$ and $b$ for urging said members in a given direction, all of which elements are used in practicing an embodiment of the invention.

We have shown our invention associated with a drum $f$ attached to a vehicle wheel $g$, and our invention is adapted to be received within said drum and arranged so that the elements $a$ and $b$ may be actuated into contact with the inner surface of the drum. This arrangement is likewise shown in Figure 3, there being a series of levers 1 and 2 in linked relation, as shown at 3, the lever 2 being joined with the usual equalizing device, or direct to a pedal as the case may be, and whereby when said levers are moved in one direction, the elements $a$ and $b$ are moved from the position of Figure 1 into contact with the brake drum, as shown in Figure 2. In this connection, the member $d$ which constitutes a carrier plate for the elements of our invention is formed with a central opening 4, whereby said plate may be fitted upon the axle housing of the vehicle and furthermore bolted or otherwise secured to said axle housing, as indicated in the several figures, the said plate to this end being provided with openings through which said bolts may be passed, as shown at 5. The method of securing the plate to the axle housing is relatively unimportant, as any of the conventional and well understood methods may be utilized for this purpose.

The inventors have found that one of the prime difficulties with existing brakes for vehicles is a lack of equalization between said brakes where the brakes are mechanically or otherwise operated. Ordinary mechanical equalizers are not always efficient and the inventors have found further that brake shoes do not always engage the drum evenly with the result that the friction exerted by the brake shoes against the drum or drums may be greater with respect to certain wheels with the result that skidding and the like may occur during wet weather. It has also been found by actual experiment that a properly adjusted brake in which the brake shoes evenly contact with the brake drum prevents a locking of the wheel. In fact, it has been found that uneven contact between the drum and the shoe will more often than not cause a locking relation to exist. The most efficient brake is that brake which will not stop rotation of the wheel by causing the wheel to slide but rather will gradually stop the rotation and this is only accomplished when the brake shoes evenly engage the brake drums. Our device is so constructed that the brake shoes evenly engage the brake drums. Furthermore, our device does not depend upon one brake shoe engaging a drum in order to carry the other brake shoes into drum engagement. All of our brake shoes engage at the same time.

Referring to Figures 8 and 9, we have illustrated both forms of brake shoes, and as previously pointed out, the brake shoes $a$ and $b$ are adapted to cooperate. In particular, the brake shoe $a$ is segmental in form, one end 6 of which shoe has two outwardly extending members 7 and 8 constituting a bifurcated extension and adjacent the opposite end of said shoe and upstanding from the inner surface thereof is a lug or ear 9 formed with a transverse opening 10. Said brake shoe is likewise longitudinally slotted at 11. The periphery of said brake shoe is tapered inwardly adjacent end portions thereof, as shown at 12 and 13. The brake shoe $b$ likewise comprises a segmental member, one end of which is provided with an upstanding lug or ear 14, formed with a transverse bore 15 while the opposite end of said shoe is provided with what may be termed an offset portion 16 extending from the inner surface of said shoe and which offset portion carries an arm 17. This arm is tapered as to width from the offset portion to the end 18 thereof and said arm is likewise formed with a longitudinal tapered slot 19. The end 18 is enlarged and formed with a transverse bore 20. Sides of the offset portion 16 are channeled at 21 and 22 and said offset portion is likewise formed with a transverse bore 23 lying in the plane of said channels. The shoe is provided with a longitudinal slot 24. Also the periphery of said shoe is curved inwardly adjacent the ends thereof, as shown at 25 and 26.

The means $c$ includes a plate or arm 30 provided with a central stud or shaft 31 extending from one side of said plate or arm and two spaced studs 32 and 33 extending from the opposite side of said plate or arm. Said studs are screw-threaded at 34 and 35 and it will be noted that the stud 33 is slightly longer than the stud 32. The shaft 31 is longitudinally bored at 36 with transverse bores 37 and 38 communicating with said bore 36. The arm or plate 30 is likewise bored transversely at 39, which bore communicates with the bore 36. Furthermore, both of the studs 32 and 33 are bored longitudinally at 40 and 41, which bores are in communication with the bore 39. Said studs are likewise transversely bored at 42 and 43, which bores communicate with the longitudinal bores in the studs. The outermost end of the shaft is formed with an enlarged bore, the ball bounding the bore being screw-threaded to receive an oil fitting 44.

It is intended that our invention might be used with or without lining, as a metal to metal contact. However, in the several figures, we have shown the brake shoes provided with lining $h$. This lining may be formed of any suitable substance, such as asbestos, which has been impregnated and which asbestos may have a metal backing 50. The asbestos lining $h$ is secured to the metal backing in any approved manner, and said backing is provided with an upstanding stud 51, which upstanding stud 51 is provided with a lip 52. The metal backing is likewise provided with a spring clip 53. This spring clip is conveniently secured to the metal backing through the medium of a small block 54. This block has a portion of reduced diameter 55, which is passed through a counter-sunk opening in the backing, as shown at 56, after which the end passed through said opening in the metal backing is struck in order to make it fit tightly within the opening, as illustrated in Figure 12. The same method of fastening the stud 51 may be resorted to, as clearly shown in the figures. The spring clip 53 is secured to this block by riveting or otherwise, the clip to this end being confined in a groove 57 in the block. It is intended that the lining should be snapped in position on the brake shoes, and it is to be noted upon reference to Figure 10 that ends of said metal backing are bent inwardly so that said ends will conform to the shape of the ends of the brake shoes. Furthermore, the spring clip and the stud 51 are spaced a distance apart and in such relation that when the lining is upon the brake shoe, it is held fast thereto. In particular, the stud 51 would be passed through the slot 11 in the case of the brake shoe $a$ so that the lip 52 would engage the inner surface of said shoe, as shown in Figure 10, whereupon the spring clip would be pushed through said slot and the curved head 58 would slide along against the end wall bounding the slot 11 until it slips over and outwardly so as to in part engage the inner surface of said shoe. This method of applying the lining to the brake shoe is efficient, positive, and of easy accomplishment. It is also evident that it will be unnecessary to disassemble the brake in order to apply such lining, a factor of great importance from an economic standpoint.

The method of assembling the various units of the brake, as well as its operation and method of use, is as follows:

As stated, the brake shoes are arranged in alternate relation, that is, $a$, $b$, $a$, $b$. Two of the means $c$ are provided, and assuming a given horizontal plane passed centrally through the axle housing, then the shaft of one of said means $c$ would lie above said horizontal plane while the shaft of the other of said means would lie below, as illustrated in Figure 3. In other words, there is an off-center relationship. Referring to Figures 1 and 5, the shoe $b$ shown would have the part 14 received upon the stud 33 and this same stud would likewise receive the member 9 of the shoe $a$. These members 9 for the shoe $a$ and 14 for the shoe $b$ would be locked to said stud through the medium of the nut and washer 62. The shoe $b$ would have the arm 17 secured to the stud 32, the part 18 being carried on said stud, as shown in Figure 5, and this part 18 is locked to said stud through the medium of a washer and nut 65. The bifurcated end of the shoe $a$ would have its members 7 and 8 received within the grooves 21 and 22. Likewise, there is passed through the curved bore 23 a cylindrical roller member $j$, and which member is formed with two spaced grooves 66 and 67 corresponding to the grooves 21 and 22 and the members 7 and 8 are passed through the grooves 66 and 67 of the roller. It will be noted in this regard that the grooves 66 and 67 are of slightly greater width than the width of the members 7 and 8 and that the grooves 21 and 22 are spaced from the surfaces of said members 7 and 8. The following member b would be coupled to the contiguous member a in the manner just described, there of course being provided another means c. The means c are roughly indicated in Figure 3.

Reference is had to the figures wherein it will be seen that members 80 and 81 are secured to the members a and b and which members are formed with eye portions 82. After the members a and b have been assembled, as aforesaid, the means e are introduced and which means constitute coil springs formed with looped ends, one looped end of which engages the eye on the shoe b and the other looped end engaging the eye of the shoe a, it being noted in this regard that a portion of the spring is passed through the slot 19 of the shoe b. In Figures 1 and 2, we have shown the brake assembly within the brake drum f. The arms 1 and 2 are keyed at 100 to the shafts 31 so that a movement of the arm will produce rotation of the shafts. Thus, when the arms are moved, the shafts are rotated and inasmuch as the shafts are in an off-center relation with respect to the axle housing or the general mounting of the brake, the brake shoes are moved outwardly. If we suppose the rotation of the shafts 31 to be anti-clockwise looking at the showing of Figure 1, it is evident that the brake shoes b and a shown at 63 and 68 will be moved against the inner surface of the drum. This will, of course, occur for the brake shoes a and b shown at 60 and 61. The ends of the shoes b carrying the arms 17 will likewise be moved into engagement with the inner surface of the brake drum for the reason that the means c in each instance is connected to said arm or arms, and as this means rotates anti-clockwise, the arm or arms will tend to be moved upwardly and this upward movement will cause a rotation of the brake shoe b. Of course, upward movement of the arm 17 will communicate movement to the bifurcated end of the brake shoe a due to the interconnection between such bifurcated end and the offset portion of the shoe b. As a result, all of the several shoes move equally and at the same time, to the end that a positive engagement between said shoes and the brake drum occurs. The moment the brake is released, the means e will urge said shoes into the position shown in Figure 1 and out of engagement with the drum.

Where in the claims, we have used the terms "contiguous" and "non-contiguous", we refer to the arrangement of the brake shoes a, b. It will be noted that the relationship is a, b, a, b. Referring particularly to Figures 1 and 2 and reading clockwise, and commencing with a, we will find that the relationship is a, b for two top shoes, and a, b for two bottom shoes. Referring to the two top shoes a, b, the member a is provided with extensions 7 and 8 received within the member j, which member is carried at one end of the shoe b, this portion of the shoe b likewise having secured thereto the arm 17 pivotally secured to a member c, the member c likewise pivotally securing the member 9 at the end opposite the extensions 7 and 8 of the shoe a. The end of the shoe a carrying the extensions 7 and 8 is contiguous to that end of the shoe b which carries the member j, and the end of the shoe b that carries the member j is in non-contiguous relationship to the end of the shoe a carrying the member 9. Thus, non-contiguous ends of the shoes a and b are linked together through the medium of the means c and the arm 17.

In certain installations, it may be desirable to rearrange the means for operating the brake shoes to the end that the levers 1 and 2 would not be placed externally of the brake drum, and it is obvious that various changes and modifications and variations may be made in practicing the invention in departure from the particular showing of the drawings without departure from the true spirit thereof.

Having thus described our invention, what we claim as new and desire to secure by Letters Patent is:

1. In a brake, two shoes arranged in contiguous end relationship, an actuating means for non-contiguous ends of both the contiguous shoes to cause movement of said ends in opposite directions, and means for joining opposite ends of said shoes, and means for causing opposite and equal movement of said shoes when said first means is utilized.

2. In a brake, a pair of segmental shoes, means at one end of both said shoes for causing movement of said shoes in opposite directions, one of said shoes being provided with an arm secured to one of said means and extending beneath the other shoe.

3. In a brake, a pair of segmental shoes, one of said segmental shoes being provided with a part adapted to cooperate with the other of said segmental shoes, and means for non-contiguous ends of both said segmental shoes adapted to cause movement of said shoes in opposite directions.

4. In a brake, a pair of segmental shoes, one of said segmental shoes being provided with a bifurcated end adapted to cooperate with the other of said segmental shoes, means for one end of both said segmental shoes adapted to cause rotation of said shoes, and an arm between one of said shoes and the means for causing rotation of the other of said shoes.

5. A brake comprising four segmental shoes arranged in circular formation, two of said shoes being provided with lever arms, means causing movement between pairs of said shoes, and said lever arms being associated with said means.

6. In a brake, a plate adapted to be fitted to an axle housing, a pair of means, each comprising a lever formed with a pair of spaced studs and a central shaft journaled at diametrically opposite sides of said plates, four segmental brake shoes, two of said brake shoes being provided with extended arms, said extended arms being joined to one of the studs of both said means, and one end of two of said brake shoes being carried on the same stud with said lever and the other end of the other two of such brake shoes being carried on the other stud.

7. In a brake, a plate adapted to be fitted to an axle housing, a pair of means, each comprising a lever formed with a pair of spaced studs and a central shaft, journaled at diametrically opposite sides of said plates, four segmental brake shoes, two of said brake shoes being provided with extended arms, said extended arms being joined to one of the studs of both said means and one end of two of said brake shoes being carried on the same stud with said lever and the other end of the other two of such brake shoes being carried on the other stud, and means of connection between the free ends of said brake shoes.

8. In a brake, a plate adapted to be fitted to an axle housing, a pair of means, each comprising a lever formed with a pair of spaced studs and a central shaft journaled at diametrically opposite sides of said plates, four segmental brake shoes, two of said brake shoes being provided with extended arms, said extended arms being joined to one of the studs of both said means and one end of two of said brake shoes being carried on the same stud with said lever and the other end of the other two of such brake shoes being carried on the other stud, a slidable pivot connection for the free ends of said brake shoes, and further means for rotating said shafts to cause movement of said brake shoes.

9. In a brake, a pair of segmental shoes, contiguous ends of said shoes being in slidable pivotal relation, means for one end of both said segmental shoes adapted to cause rotation of said shoes, and means of connection between one of said shoes and the first named means, whereby movement of the first means will cause equal rotative movement of the said shoes.

10. In a brake, a plurality of interconnected segmental shoes arranged in circular relation, pairs of said shoes being provided with lever arms, means for causing movement between pairs of said shoes, said lever arms being associated with said means.

11. In a brake, two levers both formed with a pair of spaced studs and a central shaft, four brake shoes having contiguous ends thereof carried on one of said studs of both levers, slidable pivotal connections for contiguous opposite ends of said shoes, and lever arms between said slidable pivotal connections and the opposite studs of said first named levers.

12. In a brake, a lever formed with a pair of spaced studs and a central shaft, four segmental brake shoes, two of said brake shoes being provided with extended arms, said extended arms being joined to one of the studs of both said means, and the other end of the other two of such brake shoes being carried on the other studs.

13. In a brake, a lever formed with a pair of spaced studs and a central shaft, four segmental brake shoes, two of said brake shoes being provided with extended arms, said extended arms being joined to one of the studs of both said means, the other end of the other two of such brake shoes being carried on the other studs, and slidable pivotal connections between the free ends of said brake shoes.

14. In a device of the character disclosed, a lever, a shoe joined to said lever, a second segmental shoe having an end thereof contiguous to the first segmental shoe, said shoes at their contiguous ends being slidably connected, and said second shoe being provided with an arm pivoted to the lever.

15. In a device of the character disclosed, a lever, a segmental shoe joined to said lever, a second segmental shoe having an end thereof contiguous to the first segmental shoe, said shoes at their contiguous ends being slidably connected, said second shoe being provided with an arm pivoted to the lever, and means for rotating said lever to cause rotative movement of the said shoes.

CHARLES C. HIGGINS.
HARRY D. VAN BRUNT.